April 9, 1968 M. BUCZYNSKI 3,376,703
VALVING ARRANGEMENT FOR HYDROSTATIC TRANSMISSION
Filed Feb. 14, 1966 2 Sheets-Sheet 2
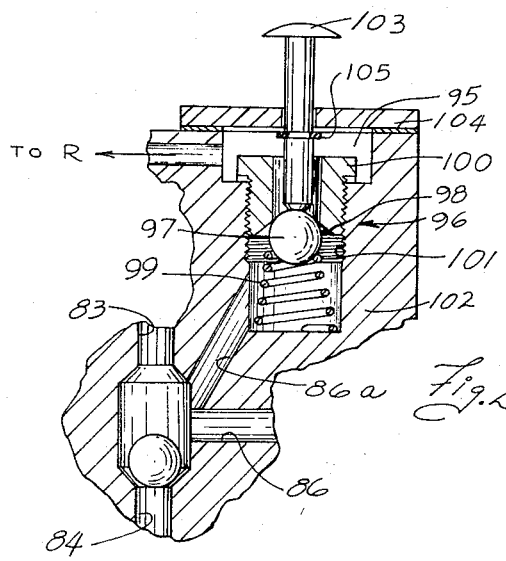
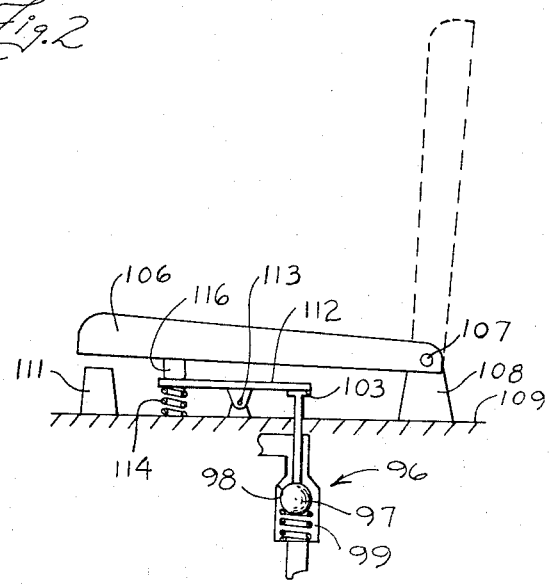
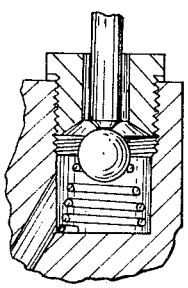
INVENTOR
Mitchell Buczynski
BY
Woodhams, Blanchard & Flynn
ATTORNEYS & # United States Patent Office 3,376,703
Patented Apr. 9, 1968

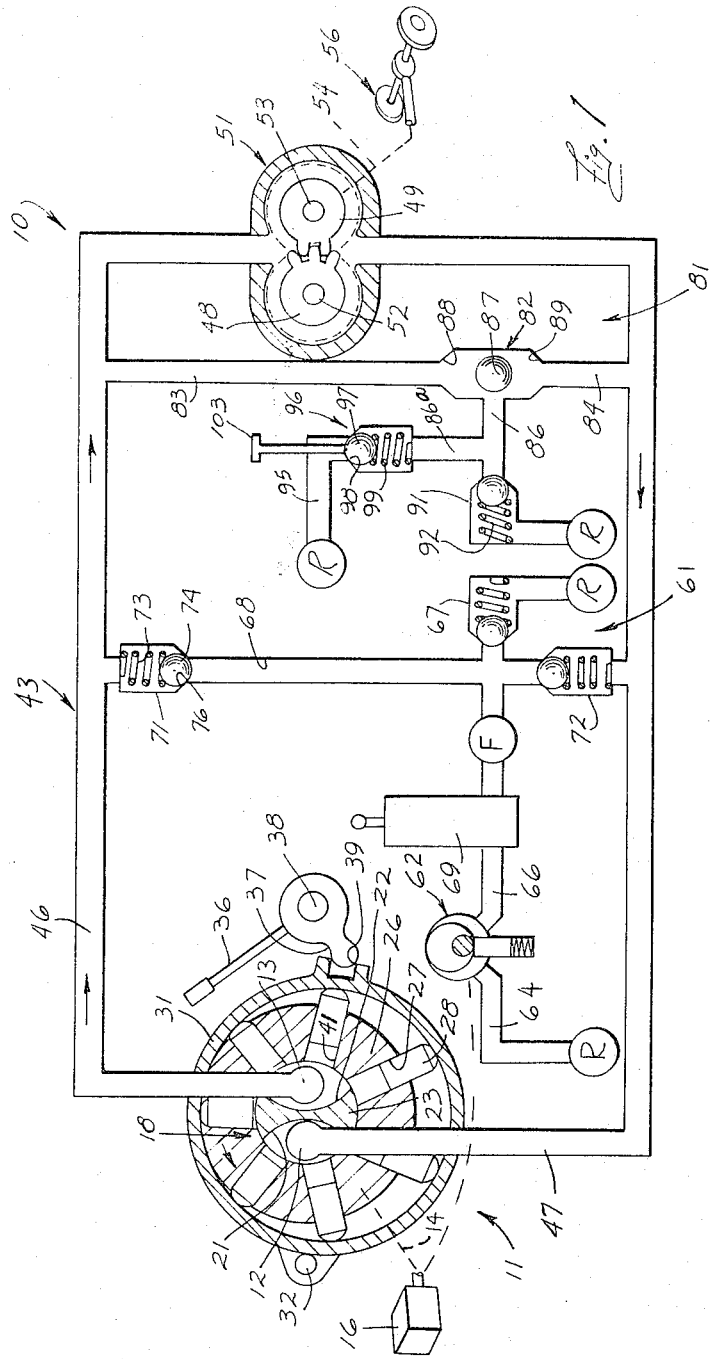

3,376,703
VALVING ARRANGEMENT FOR
HYDROSTATIC TRANSMISSION
Mitchell Buczynski, Wayne County, Mich., assignor to Eaton Yale & Towne Inc., Cleveland, Ohio, a corporation of Ohio
Filed Feb. 14, 1966, Ser. No. 527,375
12 Claims. (Cl. 60—53)

ABSTRACT OF THE DISCLOSURE

A hydrostatic transmission including a positive displacement pump and a fluid motor are connected in a hydraulic loop. Means are provided to supply fluid to the loop. Means communicating with opposite sides of the loop automatically connect a normally closed valve to the high pressure side of the fluid motor. Manual opening of the valve terminates control of the fluid motor by the pump and allows the fluid motor to be freely externally driven when the pump is de-energized.

---

This invention relates to a valving arrangement for a hydrostatic transmission and more particularly relates to a valve circuit incorporating an unloading valve for allowing the transmission output shaft to drive the transmission.

The present invention was developed as a solution to a problem resulting from the use of a hydrostatic transmission in a vehicle. More particularly, it was found that the vehicle could not be pushed with the engine thereof inoperative, either forwardly or rearwardly, due to a hydraulic lock in the hydrostatic transmission.

Hence, it is an object of this invention to provide a valve arrangement for a closed circuit hydrostatic transmission which will allow a vehicle equipped with the transmission to be pushed freely either forwardly or in reverse with the engine inoperative.

A further object of this invention is to provide a valve arrangement, as aforesaid, which includes an unloading valve actuable for allowing the transmission output shaft to be driven in either rotational direction by means outside the transmission.

A further object of this invention is to provide a valve arrangement, as aforesaid, in which the unloading valve is manually actuable for preventing hydraulic locking of the transmission upon movement of the output shaft while the input shaft is fixed.

A further object of this invention is to provide a valve arrangement, as aforesaid, in which the unloading valve need remain actuated for only a relatively short period of time, while the vehicle is being pushed with its engine inoperative, in order to prevent occurrence of hydraulic lock in the transmission during subsequent movement of the vehicle.

A further object of this invention is to provide a valve arrangement, as aforesaid, in which the hydrostatic transmission is returned to its normal state of operation substantially instantaneously upon starting of the vehicle engine, such return to normal operation occurring automatically and without attention by the vehicle operator.

A further object of this invention is to provide a valve arrangement, as aforesaid, which can be incorporated into new or existing hydrostatic transmissions without materially increasing the cost and complexity thereof and without sacrificing dependability and ease of maintenance.

Further objects and purposes of this invention will be apparent to persons acquainted with apparatus of this general type upon reading the following description and inspecting the accompanying drawings.

In the drawings:

FIGURE 1 is a schematic diagram of a hydrostatic transmission embodying the invention.

FIGURE 2 is a fragmentary central cross-sectional view of an unloading valve in the circuit of FIGURE 1.

FIGURE 3 is a fragment of FIGURE 2 showing the valve in an open position.

FIGURE 4 illustrates schematically one advantageous use of the invention.

GENERAL DESCRIPTION

In general, the objects and purposes of this invention are met by providing an improved valving arrangement for a hydrostatic transmission connected between the engine and drive wheels of a vehicle. The hydrostatic transmission includes a positive displacement pump connected in a closed hydraulic loop with a positive displacement hydraulic motor. The hydraulic motor is capable of being mechanically driven for positively pumping hydraulic fluid therethrough. The positive displacement pump, when the vehicle engine is inoperative, at least produces substantial resistance to fluid flow therethrough and may, in some embodiments, completely block such flow. Valve means are connected to the hydraulic loop on either side of the fluid motor to connect a manually actuable, normally closed unloading valve to the high pressure side of the fluid motor. Thus, with free fluid flow through the pump prevented, opening of the unloading valve relieves fluid pressure on the fluid outflow side of the fluid motor to allow free rotation thereof when same is being mechanically driven by its output shaft.

DETAILED DESCRIPTION

The hydrostatic transmission system 10 embodying the present invention is particularly adapted, though not limited, to driving a vehicle. The system 10 includes a positive displacement hydraulic pump 11 having hydraulic ports 12 and 13. The pump 11 is driven as indicated by the broken line 14, here from the vehicle engine indicated schematically at 16. The particular pump 11 shown is capable of passing pressure fluid therethrough only when driven by the engine 16. More particularly, the pump 11 is here a radial piston pump of a conventional type described briefly hereinbelow for convenience in reference.

The radial pump 11 includes a fixed central shaft 18. At one axial location on the shaft 18 circumferentially elongated recesses 21 and 22 are provided which communicate, as indicated schematically in FIGURE 1, with the ports 12 and 13, respectively. The recesses 21 and 22 are separated by a web portion 23 of the shaft which runs diametrically thereacross. An annular piston carrier 26 snugly but rotatably surrounds the shaft 18 and is rotatably driven as indicated by the broken line 14 from the engine 16. The piston carrier has a pluarlity of preferably evenly spaced bores 27 extending radially therethrough into which are pistons 28 snugly but radially slideably received. The length of the pistons corresponds generally to that of the bores 27. The piston carrier 26 is preferably axially centered on the recesses 21 and 22, the inner ends of the bores 27 opening successively to the recesses 21 and 22 as the piston carrier 26 rotates about the shaft 18. The piston carrier 26 is loosely surrounded by a retainer ring 31 which prevents the pistons 28 from completely leaving their bores 27 although allowing limited movement of the pistons along such bores. The retaining ring 31 is mounted for pivotal movement as indicated at 32 about an axis parallel to that of the shaft 18.

A manually operable shift lever 36 is provided on an actuating level 37. The actuating lever 37 is pivotally mounted as indicated at 38 for movement by said shift lever about an axis parallel to that of the pivot 32 and spaced diametrically across the shaft 18 therefrom. The end of the actuating lever 37 is rounded and fits in a recess 39 in the opposed outer face of the retaining ring 31. Thus, pivotal movement of the actuating lever 37 about the axis of the pivot 38 results in a corresponding pivotal movement of the retaining ring 31 about the pivot 32.

As a result, the retaining ring 31 may be positioned coaxially with the piston carrier 26 and shaft 18 by moving the shift lever 36 rightwardly from its position shown to a central position. When so positioned, the retaining ring 31 merely maintains a uniform limit to outward movement of the pistons so that the pistons stay at the same radial distance from the center of the shaft 18 as they rotate thereabout.

On the other hand, when the shift lever is moved leftwardly as to its limiting position shown or rightwardly to its rightward limiting position, not shown, the retaining ring 31 is pivoted vertically about the pivot 32 to an eccentric location with respect to the carrier 26. Thus, a piston riding on the inner surface of the retaining ring 31 will be alternatively moved inwardly and allowed to move outwardly as the carrier 26 rotates. More specifically, when the lever 36 is shifted leftwardly as shown to pivot the retaining ring 31 downwardly to its position shown, the top of the retaining ring moves very close to the top of the carrier 26 and the bottom of the retainer ring becomes further spaced from the bottom of the carrier. As a result, the ring 31 retains the piston 28 at the top of the carrier 26 substantially completely telescoped within their bores in the carrier 26 and hence close to the shaft 18. The retaining ring allows the pistons to move radially outwardly gradually as the carrier 26 rotates same, for example, in a counter-clockwise direction away from their uppermost position. The spacing of the retaining ring from the carrier 26 allows the pistons to move to a substantial distance within the bores 27 away from the shaft 18 at their lowermost position. Thus, there is defined between the inner end of each piston and the inner end of the corresponding bore 27, a chamber 41 of variable volume moved by rotation of the carrier 26 into alternative communication with the recesses 21 and 22.

The ports 12 and 13 communicate with portions of a closed hydraulic loop generally indicated at 43 including passages 46 and 47. The passages 46 and 47 may be provided in any convenient manner and may be independent conduits or holes cut or formed in a solid transmission housing or the like. The passages 46 and 47 connect to opposite sides of a suitable positive displacement fluid motor 51 which operates as a positive displacement pump when the output shaft thereof is driven by an external motor source. The fluid motor 51 is here shown as a conventional gear pump having meshed gears 48 and 49. The passages 46 and 47 communicate with opposite sides of the bight of the gears. The gears 48 and 49 have shafts 52 and 53 fixed with respect thereto and rotatable therewith, one or both of which is joined as indicated by the broken line 54 to a suitable load, here the driving wheels 56 of the vehicle.

The transmission system 10 further includes a fluid pressure supply portion generally indicated at 61 the purpose of which is to supply hydraulic fluid at a relatively low pressure to the passages 46 and 47 should the pressure therein fall below a predetermined minimum pressure. In the particular embodiment shown, the low pressure supply portion 61 includes a rotary roll pump 62 of a conventional type preferably driven by the engine 16. The input passage 64 of the roll pump 62 connects to a suitable reservoir R containing hydraulic fluid. The output passage 66 of the roll pump 62 connects through a suitable filter F to a cross passage 68. If desired, an auxiliary valve 69 for feeding other devices on the vehicle may be provided between the roll pump and filter. The cross passage 68 connects at its opposite ends to the passages 46 and 47, respectively, through check valves 71 and 72. The check valves are of any conventional type and are provided with springs 73 to urge balls 74 therein toward the intermediate portion of the passage 68 to a closed position against corresponding seats 76. The check valves 71 and 72 are oriented to prevent flow from the passages 46 and 47 into the passage 68 and to allow flow from the passage 68 into the passages 46 and 47 upon a pressure drop from the passage 68 to said other passages 46 and 47 sufficient to overcome the spring 73, such spring normally exerting a relatively light pressure. In addition, the passage 68 is provided with a low pressure relief valve 67 which comprises a check valve similar to the valves 71 and 72. The low pressure relief valve 67 opens in response to excessive pressure in the passage 68 to vent same to the reservoir R.

The transmission system 10 further includes a high pressure relief portion generally indicated at 81 which consists of a differential valve 82 connected at its ends by passages 83 and 84 to the afore-mentioned passages 46 and 47, respectively. A further passage 86 communicates with the central portion of the differential valve 82. The differential valve 82 may be of any convenient type but here is shown as including a ball 87 freely movable between seats 88 and 89 against which the ball may be alternatively seated for isolating the corresponding one of the conduits 83 and 84 from the central portion of the valve 82 and, hence, from the passage 86. A high pressure relief valve 91 connects between the conduit 86 and the afore-mentioned reservoir R and opens in response to substantially higher than normal pressures in the passage 86. The high pressure relief valve 91 may be of any conventional type but is here shown as a check valve of the same general type as the check valves 71 and 72 above described. The spring 92 of the high pressure relief valve 91 is, however, substantially stronger than the springs 73 of the valves 71 and 72 for purposes appearing hereinafter.

The inlet end of a manually actuable unloading valve 96 connects through the passage 86a to the central portion of the differential valve 82. The valve 96 is normally closed but is manually openable to connect the passage 86 with the afore-mentioned reservoir R. The unloading valve 96 may be of any convenient type. However, as seen in FIGURES 1, 2 and 3, the valve 96 here includes a chamber 101 defined by a recess in the wall of a suitable housing indicated fragmentarily at 102 which may be the housing for the entire transmission system. An annular plug 100 threads adjustably into the open end of the chamber 101 and is provided with a conical seat 98 at the inner end thereof. A manually energizable plunger 103 extends through the casing 104, preferably from the driver's compartment of the vehicle and loosely through the annular plug 100 substantially coaxially with the seat 98. The valve 96 further includes a ball 97 normally urged against the seat 98 by a spring 99. The casing 104 and housing 102 define therebetween a low pressure zone 95 in the transmission communicating with the reservoir R. A snap ring 105 may be provided if desired to hold the plunger 103 in place. Downward movement of the plunger causes the lower end thereof to move the ball 97 away from the seat 98 to open the valve 96 to fluid flow from the passage 86 to the reservoir R.

OPERATION

With the engine 16 running and the roll pump 62 applying fluid under low pressure to fill the loop 43 and passages 83 and 84, centering of the shift lever 36 and ring 31 maintains a fixed outer limit to piston movement through the rotation of the carrier 26. In such state there is no pressure drop between the lines 46 and 47 with the vehicle stationary and hence no torque on the gear motor 51.

Movement of the shift lever 36 leftwardly to its position shown will cause the radial pump 11 to displace fluid from the passage 47 positively into passage 46 at a rate proportional to the speed of rotation of the carrier 26 by the engine 16. More specifically, the successive ones of the pistons 28 are urged by the relatively low pressure of the fluid in the passage 47 outwardly against the inner surface of the retaining ring 31 as the carrier 26 rotates. Low pressure fluid from the recess 21 fills each chamber 41 as it gradually enlarges due to outward movement of the piston as the piston is carried downwardly along the open side of such recess 21. Thus, when a piston reaches its downwardmost position, its fluid filled chamber 41 is enlarged to maximum volume. Further rotation of the carrier 26 causes the chamber 41 to be brought into communication of the recess 22 and, hence, with the passage 46 and causes the ring 31 to force each piston 28 inwardly, thereby diminishing the size of the chamber 41 thereof and forcing the contents thereof positively into the passage 46. The resulting pressure in the passage 46 depends upon the extent to which flow is restricted through the motor 51. Thus, if the vehicle is initially at rest the pressure in the passage 46 will rapidly rise after leftward movement of the shift lever until sufficient to rotate the gears 48 and 49 of the gear motor 51 in a known manner and thereby cause the vehicle to move.

Movement of the shift lever to its central position with the vehicle at rest allows the engine to be operated without causing radial pump to energize either of the lines 46 and 47 and hence without energizing the gear motor 51.

To avoid stalling of the engine 16 when the restriction of flow through the motor 51 is great, such as when the vehicle is heavily loaded and at a standstill, the shift lever 36 may be moved gradually from its centered position in a manner to keep the engine r.p.m. in the desired range as the vehicle accelerates. The pump produces a relatively large multiplication of engine torque when the shift lever is near its central position and a lesser multiplication when the lever is substantially spaced from center.

The differential valve 82 and high pressure relief valve 91 are provided to limit the maximum pressure applied to the gear motor 51, and thus the torque output of the system 10, to a safe level to avoid damage to the system 10. More specifically, a pressure drop from the passage 46 to the passage 47, and hence from the passage 83 to the passage 84 will cause the ball 87 of the differential valve 82 to move downwardly against the lower seat 89 thereby closing the upper end of the passage 84 and allowing flow from the upper passage 83 through the chamber of the differential valve and into the passage 86. The spring 92 of the relief valve 91 is relatively strong and maintains the valve 91 closed until the pressure in the passage 86 reaches a relatively high level, preferably somewhat above a level corresponding to the rated torque of the system 10. When such pressure is reached, the relief valve 91 opens and fluid from the high pressure line 46 moves through the passage 83, valve 82 and passage 86 thence through the high pressure relief valve 91 to the reservoir R. It is generally desirable that the opening pressure of the high pressure relief valve 91 be relatively high since any decrease in the opening pressure will effect a corresponding decrease in the maximum fluid pressure supplied to the fluid motor 51 and thereby in the maximum torque supplied to the road wheels 56.

Loss of fluid from the path 43 as due to the afore-mentioned opening of the high pressure relief valve 91 is replaced by the roll pump 62. In particular, venting of the high pressure passage 46 through the high pressure relief valve 91 prevents stalling of the pump 11. Thus, the pump continues to draw fluid from the low pressure passage 47 thereby dropping the fluid pressure therein and allowing the check valve 72 to open in response to the low pressure fluid from the roll pump 62. As the vehicle speed increases, the flow through the gear motor correspondingly increases. Thus, the back pressure in the passage 46 caused by the gear motor 51 will diminish and soon allow the high pressure relief valve 91 to close. Movement of the shift lever back toward or to its central position from its leftward position shown after the vehicle has assumed a steady speed diminishes the pressure in the passage 46 and builds up the back pressure on the pump in the line 47. The resulting reversal of the pressure drop across the motor 51 tends to decelerate same and thereby brakes the vehicle.

Movement of the shift lever 36 to a position right of center raises the ring 31 until the bottom portion thereof lies closely adjacent the bottom of the carrier 26 and the upper portion thereof is at a substantially greater distance from the top of the carrier. Thus, the pistons 28 will be at the radially outermost point when at top dead center and the radially innermost point when at bottom dead center. Thus, with the carrier rotating in the counter-clockwise direction, the outwardly moving pistons will enlarge the chambers 41 when the latter are in communication with the recess 22 thereby drawing fluid from the line 46 and will diminish when in communication with the recess 21 thereby filling the line 47. Thus, when the vehicle is at rest, such pressurization of the line 47 will result in a reverse rotation of the gear motor 51 and hence reverse driving of the vehicle. The above-described operation of the transmission 10 in the forward direction is the same for reverse.

When the vehicle motor 16 is inoperative, the pump 11 blocks flow between lines 46 and 47. More particularly, the carrier 26 will not rotate in response to pressurization of either line 46 or 47 since such pressurization merely presses the pistons radially outwardly against the retaining ring 31 and generates no circumferential forces capable of rotating the carrier 26. With the carrier 26 stationary, no fluid can move between the lines 46 and 47 through the pump 11 since fluid moves through the pump only when carried in the piston chambers 41 from one of the recesses 21 and 22 to the other thereof during rotation of the carrier. An attempt to rotate the gears of the gear motor 51 with the engine inoperative as by pushing the vehicle would thus result only in pressurization of one of the lines 46 and 47 by the gear motor. With the carrier 26 stationary the only path left to the fluid pressurized by the gear motor is that through the high pressure relief portion of the circuit as indicated at 81. Thus, the high pressure in the line 47 will cause the ball 87 in the differential valve 82 to seat against the upper seat thereof and allow pressurization of the passage 86 from the passage 84. However, the pressure relief valve 91 will not open until the pressure in the line 86 and, hence, line 47 has reached a relatively high pressure, the resulting back pressure on the motor 51 being substantially the maximum allowed system pressure. Thus, for all practical purposes, the circuit 10 can be at this point said to be hydraulically locked. Correspondingly, the vehicle driving wheels 56 resist rotation with a torque substantially equal to the maximum driving torque which can be exerted thereon by the transmission system 10 when the engine 16 is running. Thus, as a practical matter, the vehicle cannot be pushed, the drive wheels being in effect locked due to the hydraulic lock in the circuit 10.

To relieve the back pressure on the gear motor 51 and allow the vehicle to be readily pushed without being retarded by the transmission circuit 10, the unloading valve 96 may be opened by manually pushing the plunger 103 downwardly to unseat the ball 97 from the seat 98. Opening of the unloading valve 96 allows high pressure fluid in the passageway 86 to pass through the chamber 101 and the annular space between the plunger 103 and annular plug 100 to the reservoir R. Upon release of the plunger 103, spring 99 returns the ball 97 to its seated position against the seat 98 to close the unloading valve 96. During the time in which the unloading valve 96 is open, the gear motor turns relatively freely in response to pushing of the vehicle relieving any pressure in the passage 46 by removing the fluid therein adjacent the gear motor and urging same into the passageway 47 and, thence, through the unloading valve 96 to the reservoir. It will be apparent that passage 46 will normally be dropped to atmospheric pressure relatively quickly by the gear motor 51 and, in one embodiment of the invention, it was found that the input side of the gear motor 51 could be purged of fluid in less than one revolution of the drive wheels. Once this has taken place, the unloading valve 96 can be allowed to close without return of the hydraulic lock since the passages 46 and 47 will not be recharged with low pressure fluid by the low pressure supply 61 with the engine inoperative, the roll pump 62 being inoperative when the engine 16 is inoperative.

Upon restarting of the engine 16, the roll pump 62 becomes operative and quickly recharges the passages 46 and 47 with fluid so that the pump 11 can once again supply high pressure fluid to the gear motor 51 as above described.

FIGURE 4 illustrates one particular environment of use for the invention as applied for example to a garden tractor, golf cart, factory or warehouse lift truck or similar unit, wherein it is desired both to make certain that it will not be activated by unauthorized personnel and to make certain that it will not be activated without a person in the proper position on the seat. In FIGURE 4 there is illustrated a seat 106 mounted pivotally at 107 through brackets 108 to a base structure 109. An abutment 111 limits the distance normally the seat 106 can move when a person is sitting thereon. The plunger 103 is contacted by the rightward end of a lever 112 which is pivotally mounted at 113 to said base 109. The leftward end of said lever is urged constantly upwardly by a spring 114 and urged downwardly when a person is on said seat by the abutment 116. The spring 114 is of sufficient strength normally to overpower the spring 99 whereby to hold the ball 97 off of the seat 98 except when a person, or equivalent weight, is occupying the seat 106.

In this way the vehicle with which the system of the invention is associated becomes automatically inactivated whenever the operator leaves the seat 106 and is automatically reactivated by his resuming a position on the seat. The plunger 103 may be still accessible, if desired, for manual operation when it is desired to push the vehicle with the engine off and with an operator in position on the seat 106.

Although a particular preferred embodiment of the invention has been disclosed above, modifications or variations thereof which lie within the scope of the appended claims are fully contemplated.

The embodiments of the invention in which an exclusive property or privilege is claimed are defined as follows:

1. A closed hydrostatic transmission circuit comprising the combination:
    a positive displacement pump and a positive displacement fluid motor connected therewith in a closed hydraulic loop for pressurization thereby;
    at least one valve and conduit means connecting same to the high pressure side only of said fluid motor;
    means independent of said pressurization for opening said valve;
    whereby said pressure may be maintained by closing of said valve and said loop may be vented by opening of said valve to free said motor of control by said pump.

2. The device defined in claim 1 wherein said conduit means includes means responsive to the pressure differential in said loop on either side of said fluid motor for connecting said valve to said loop on the high pressure side of said fluid motor, said valve being openable to relieve such pressure.

3. The device defined in claim 2 in which said differential responsive means comprises a differential valve including a chamber, the ends of which comprise valve seats and are connected to said loop on opposite sides of said fluid motor, and an opening intermediate said ends of said valve chamber connected to said pressure relief valve, said differential valve further including a valve element freely movable in the chamber and responsive to a pressure drop across the fluid motor for closing said chamber to the low pressure side of said fluid motor and allowing flow from the high pressure side of said fluid motor through the differential valve chamber to said pressure relief valve.

4. The device defined in claim 2 in which said pressure relief valve comprises means defining a valve chamber having a spaced pair of openings therein, one of said openings being closed by an annular plug adjustably threaded thereinto, a valve seat defined on the end of said plug in said chamber, a ball and spring disposed within said chamber, said ball lying adjacent said seat and said spring urging said ball against said seat to prevent fluid flow outwardly of said chamber therepast, a plunger having one end loosely telescoped within the annular plug, the other of said openings being connected to said differential pressure responsive means, said plunger being manually actuable for entering said chamber and pushing said ball away from said seat to allow free fluid flow from the other of said openings through said chamber and outwardly past the telescoping plunger and plug.

5. A hydrostatic transmission system for connecting the engine and drive wheels of a vehicle, comprising in combination:
    a pump driven by said engine having a pair of fluid ports;
    a gear motor for driving the drive wheels having a pair of fluid ports;
    a first passage connecting one of said motor ports to one of said pump ports;
    a second passage connecting the other of said motor ports to the other of said pump ports;
    a low pressure fluid source energized when said engine is operative;
    means including check valves for connecting said low pressure fluid source to said first and second passages, said check valves being arranged to open when the pressure of the low pressure source exceeds that in one of said passages by a predetermined amount;
    a differential valve connected between said first and second passages and having a relief portion, said differential valve being responsive to a pressure drop between said first and second passages for connecting the higher pressure one of said first and second passages to said relief portion;
    a manually actuable, normally closed unloading valve connected to said relief portion, opening of said unloading valve dropping the pressure in the high pressure one of said first and second passages to allow said gear motor to turn freely when said pump is locked whereby to allow the vehicle to be freely pushed when the engine is inoperative.

6. The device defined in claim 5 in which said pump comprises a fixed central shaft having a circumferentially spaced pair of outwardly opening recesses in the peripheral wall thereof and means providing communication between said recesses and corresponding ones of said ports, an annular carrier rotatably and snugly disposed on said shaft for covering said recesses, a circumferentially spaced plurality of bores extending radially through said carrier, a piston disposed for radial reciprocation along and within each of said bores, the inner ends of said bores communicating alternatively with each of said recesses as said carrier is rotated about the axis of said shaft, a retaining ring loosely surrounding said carrier and mounted for eccentric adjustment with respect to said carrier in a direction generally along the chordal direction of said recesses, said retaining ring limiting outward movement of the pistons along the bores whereby rotation of the carrier with the retaining ring centered thereon allows flow through said pump from one port thereof to the other without pressurizing the fluid passing therethrough whereas rotation of the carrier with the retaining ring disposed eccentrically thereof causes the pistons to pump liquid through said pump, said pump being closed to the flow of liquid therethrough when said carrier is stationary.

7. The device defined in claim 2 including resilient means normally holding said valve in closed position.

8. The device defined in claim 2 including safety means holding said valve in open position and further means responsive to a predetermined position of an operator for overpowering said safety means and urging said valve into a closed position.

9. The device defined in claim 2 including frame structure and safety means normally holding said valve in open position;
a seat pivotally mounted with respect to said frame structure normally held by said safety means in a raised position, the weight of an operator on said seat lowering same against said safety means for overpowering same and means thereupon automatically effecting closure of said valve.

10. The device defined in claim 1 including ratio means independent of said valve opening means and adjustable for varying the displacement of said pump, means for supplying fluid to said loop, said valve opening means being independent of said fluid supplying means and said valve including means biasing same toward a closed position.

11. The device defined in claim 1 including a pressure fluid supply for said loop, said supply having outlet and return portions, said valve being operatively disposed between said return portion and said high pressure side of said fluid motor.

12. A closed hydrostatic transmission circuit, comprising the combination:
a positive displacement pump and a positive displacement fluid motor connected therewith in a closed hydraulic loop for pressurization thereby;
a reservoir and means energizable for supplying fluid from said reservoir to said loop;
a normally closed, manually actuable valve and means responsive to a pressure differential across said loop for connecting said valve between the high pressure side of said loop and said reservoir whereby momentary actuation of said valve with said pump and supply inoperative allows free wheeling of said motor thereafter until energization of said fluid supply means recharges said loop with fluid.

References Cited
UNITED STATES PATENTS

| | | | |
|---|---|---|---|
| 3,334,488 | 8/1967 | Lauck | 60—52 |
| 2,931,454 | 4/1960 | Schuster | 180—101 |
| 2,946,193 | 7/1960 | Chittenden | 60—53 |
| 3,135,087 | 6/1964 | Ebert | 60—53 X |
| 3,224,197 | 12/1965 | Lauck | 60—53 |
| 3,253,411 | 5/1966 | Swedberg | 60—53 |

EDGAR W. GEOGHEGAN, *Primary Examiner.*